United States Patent [19]

Klootwyk et al.

[11] 4,200,685
[45] Apr. 29, 1980

[54] POWER MODULE WITH GAS PRESSURIZED DEFORMABLE CASING SIDE PANELS

[75] Inventors: Ronald I. Klootwyk, San Jose; Lawrence J. Pagendarm, Santa Clara, both of Calif.

[73] Assignee: The Continental Group, Inc., New York, N.Y.

[21] Appl. No.: 21,275

[22] Filed: Mar. 16, 1979

[51] Int. Cl.² ............................................. H01M 2/02
[52] U.S. Cl. ...................................... 429/70; 429/163; 429/176; 429/185
[58] Field of Search ................................... 429/70–72, 429/174, 176, 185, 149, 152, 122, 163

[56] References Cited

U.S. PATENT DOCUMENTS

| 3,551,208 | 12/1970 | Stachurski | 429/68 X |
| 4,109,064 | 8/1978 | Warner et al. | 429/66 |

*Primary Examiner*—Anthony Skapars
*Attorney, Agent, or Firm*—Charles E. Brown

[57] ABSTRACT

A power module of the electrochemical battery type wherein shunt losses along the side edges of the anodes disposed generally parallel to the electrolyte path are prevented by the anode side edges being sealed relative to the casing by the casing being constructed with internal side walls which are deformable under gaseous pressure to maintain sealing contact with the cell units.

8 Claims, 3 Drawing Figures

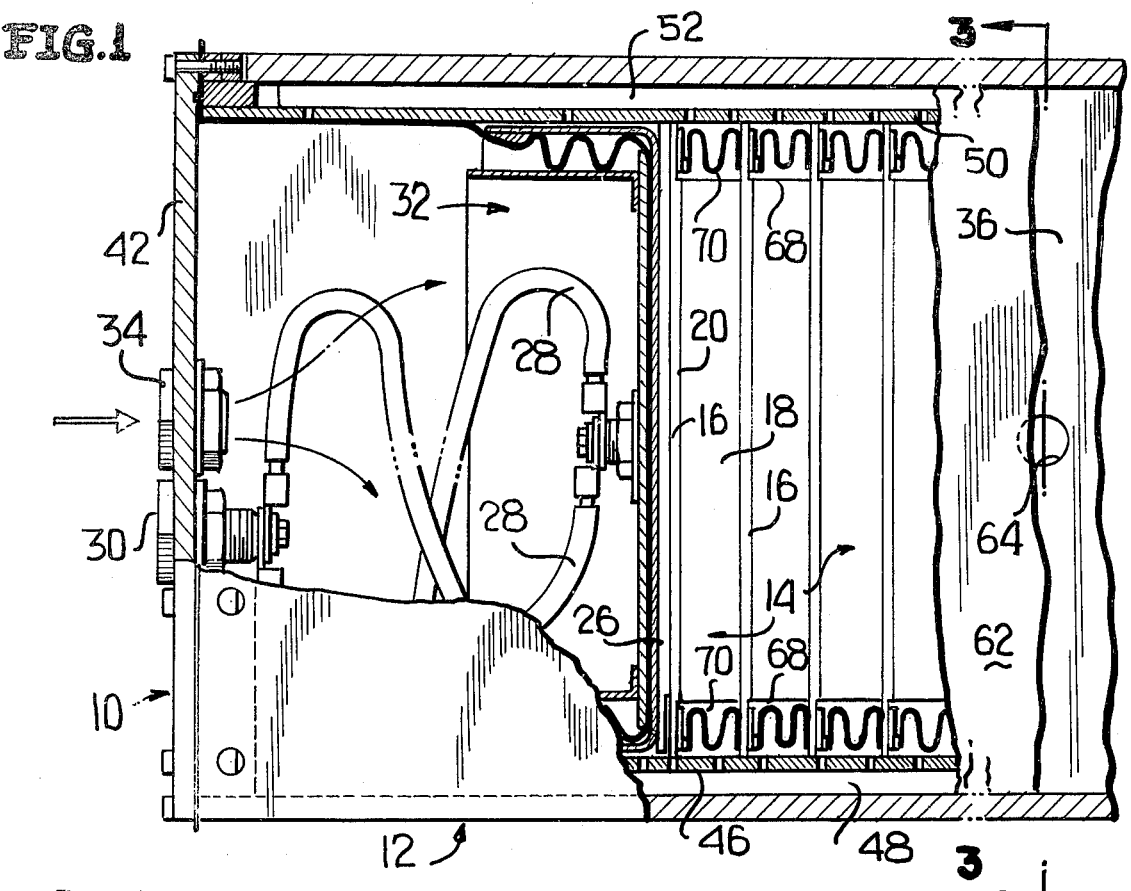

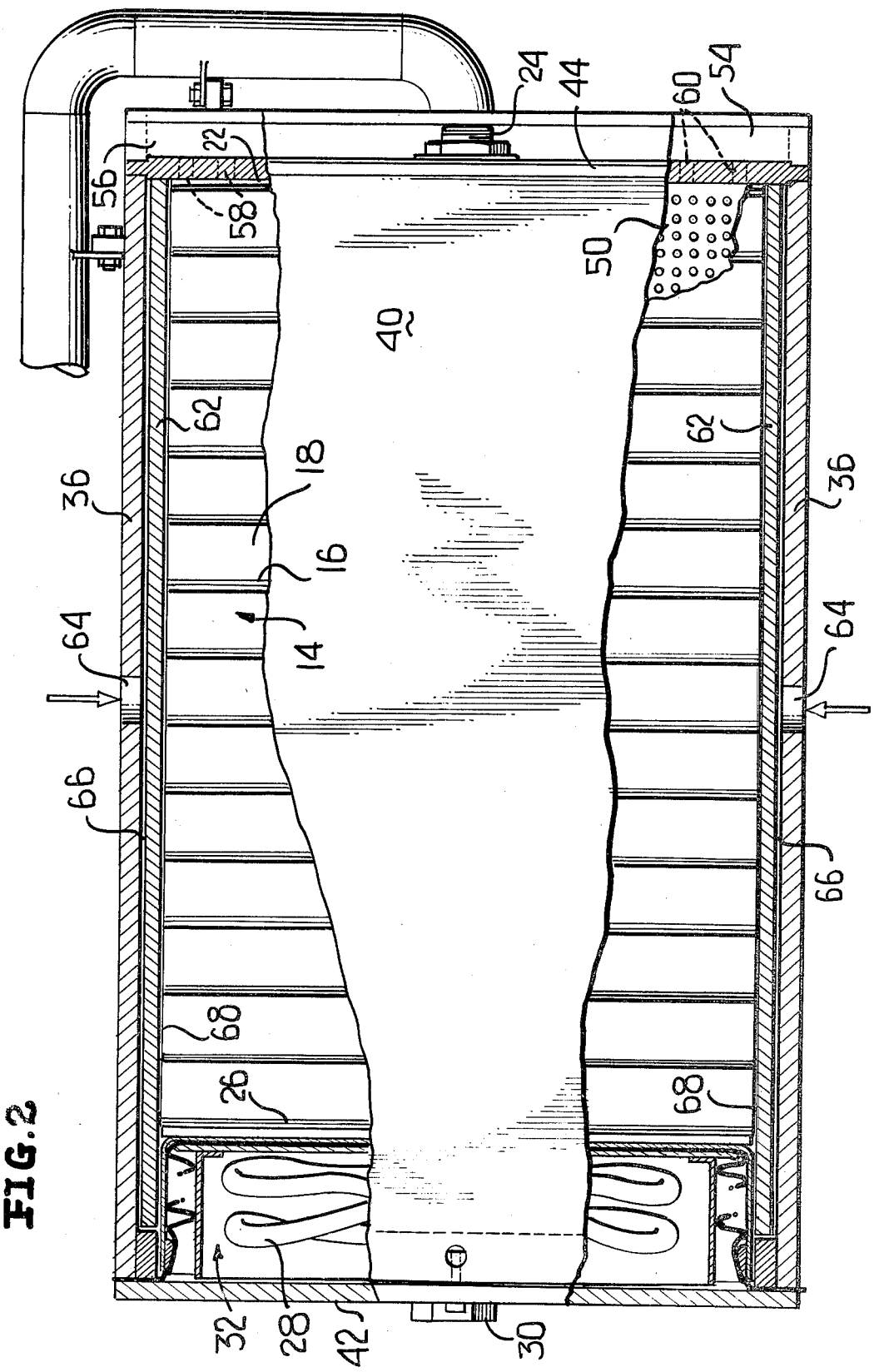

POWER MODULE WITH GAS PRESSURIZED DEFORMABLE CASING SIDE PANELS

This invention relates in general to new and useful improvements in power modules, and more particularly to power modules of the electrochemical battery type where power units, each including an anode and a cathode, are arranged in stacked relation where pressure is exerted to maintain a uniform pressure contact between the anodes and cathodes and where electrolyte flow between the anode and cathode of each cell unit occurs during all operating stages of the power module.

In existing bipolar modules shunt losses have been experienced, and it is the purpose of this invention to reduce shunt losses by providing for a tight pressure seal between side edges of the anodes and walls of the casing in which the cell units are mounted.

In accordance with this invention, the casing is constructed with upper and lower manifolds so that electrolyte flow between each cathode and anode is vertical. In order to prevent the presence of electrolyte along the sides of the cell unit and most particularly along the sides of the anodes, the casing is provided with vertically disposed inner side walls which are floatingly mounted and are flexible. A gaseous pressure is applied between the inner side walls and the adjacent side walls of the casing so as lightly to press the inner side walls against the cell units in general and the anodes in particular to form the desired seal.

The seal between each anode and the flexible side wall is further enhanced by applying at least to the vertical side edges of each anode an electrolyte resistant covering which is cooperable with the adjacent surface of the deformable side wall to form a seal.

The anodes are consumable and therefore as the power module is utilized, the cells decrease in thickness with the result that the anodes must slide relative to the casing. The flexible side walls are formed of suitable plastics material which has a low friction coefficient with respect to the cell units, and therefore although the cell units are sealed relative to the flexible side walls, there is not an undue drag placed upon the cell units.

In accordance with the foregoing, the covering for the anode is preferably formed of a plastics material film which has a minimal friction resistance sliding engagement with the flexible side wall.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a fragmentary side elevational view of a power module formed in accordance with this invention, parts of the casing being broken away and shown in section.

FIG. 2 is a top plan view of the power module of FIG. 1, with upper portions of the casing being broken away and shown in section so as to illustrate the position of the flexible side walls within the casing.

FIG. 3 is a transverse vertical sectional view taken generally along the line 3—3 of FIG. 1 through the casing per se, and shows the specific cross sectional construction of the casing including the mounting of the flexible side walls.

Referring now to the drawings in detail, it will be seen that there is illustrated a power module constructed in accordance with this invention and generally identified by the numeral 10. Simply stated, the power module 10 includes a casing 12 and a plurality of cell units 14 disposed within the casing 12 in stacked relation. Each cell unit is preferably formed of a cathode 16 and a consumable anode 18 formed of a material such as lithium and aluminum and the like. There is provided between each cathode 16 and its adjacent anode 18 an interface 20 which is not part of this invention, but which is such that there can be controlled electrolyte flow along this interface between the cathode 16 and the anode 18. The interface may be defined either by a grid formation formed on the face of the cathode 16, or by a screen member carried by the face of the cathode. Inasmuch as the construction of the cell units per se is not a part of this invention, the cell units 14 are not described in further detail here.

At the right end of the casing 10, as shown in FIG. 2, there is a terminal plate 22 carrying a terminal 24. At the right end of the stack of cell units 14 there is another terminal plate 26 to which there are connected leads 28 having the opposite ends thereof connected to a second terminal 30.

In addition, within the left end of the casing 10 there is provided a cell unit stack pressure applying assembly generally identified by the numeral 32. The assembly 32 is arranged to receive gaseous pressure through a fitting 34 and to apply a constant pressure on the cell unit stack through the terminal plate 26 such that there will be a constant pressure between the anode and cathode of each cell unit along the interface 20 notwithstanding the erosion of the anodes in the use of the power module.

This invention most particularly relates to the construction of the casing 12. The casing 12 is of a rectangular configuration and is elongated in the direction of stacking of the cell units 14. The cell units 14 are disposed vertically within the casing 12.

The casing 12 includes a pair of side walls 36 which are suitably connected to a bottom wall 38 and a top wall 40. The left end of the casing 12 includes an end wall 42 (FIG. 2) and an end wall 44 at the right end of the casing.

Internally of the casing there is a bottom manifold plate 46 which is spaced from the bottom wall 38 by suitable spacers 48. A like upper manifold plate 50 is disposed below the top wall 40 and is spaced therefrom by means of suitable spacers 52. As shown in FIG. 1, the manifold plates 46, 50 extend the full length of the casing 12 between the end walls 42 and 44. The manifold plates 46, 50 are perforated so that there may be constant electrolyte flow through the cell units.

At the right end of the casing 12 there is an upper manifold 54 and a lower manifold 56 (FIG. 2). The lower manifold 56 is aligned with the space between the manifold plate 46 and the bottom wall 38 and is in communication with that space through suitable openings 58 in the end wall 44. The manifold 56 is preferably a supply manifold.

The upper manifold 54, which is preferably a return manifold, is aligned with the space between the upper manifold plate 50 and the top wall 40 and is in communication with that space by means of suitable openings 60 through the end wall 44.

This invention most particularly relates to the provision of the casing 12 with inner deformable walls or plates 62 which are mounted within the casing 12 adjacent the side walls 36 and extend the full height between the bottom wall 38 and the top wall 40 as is best shown in FIG. 3. The side walls 36 have suitable openings 64 therethrough through which a suitable gas under pressure may be directed into the space 66 between each set of side walls 36,62.

It is to be noted that the flexible inner side walls 62 engage the side edges of the manifold plates 46, 50 and form seals therewith. Further, since the inner walls 62 extend the full height of the casing, the walls 62 are sealed relative to the top and bottom walls of the casing.

As shown in FIG. 2, the right ends of the walls 62 engage the end wall 44 and form a seal therewith. The left ends of the walls 62 extend into the area occupied by the assembly 32 which incidentally is shown in the starting stage of the power module in FIG. 2 and in the partially consumed stage in FIG. 1.

As is clearly shown in FIG. 2, when the power module 10 is assembled and the spaces between the sets of walls 36, 62 are pressurized, the flexible walls 62 are forced into contact with the side edges of the anodes and form a seal therewith.

The walls 36, by forming a cell with the vertical side edges of the anodes 18 and also with the cathodes 16, prevents the existance of electrolyte along the sides of the stack of power cells 14. Thus shunt losses along the sides of the cell unit stack are eliminated for all practical purposes.

Further to prevent electrolyte contact with the side edges of the anodes 18, a suitable covering 68 is applied to the vertical side edges of the anodes 18. This covering is preferably in the form of a tape formed from a film of plastics material which is resistant to the electrolyte. The covering 68 applied to the vertical side edges of the anodes 18 directly contacts the inner surfaces of the flexible walls 62 and enhances the forming of the seals between the walls 62 and the anodes 18. Further, because of the normally slippery nature of plastics material films, the friction drag between the anodes and the flexible walls 62 is held to a minimum, thereby permitting the cell units 14 to slide freely within the casing 12 under the influence of the assembly 32.

At this time it is pointed out that the casing 12 is preferably formed of suitable plastics material and it has been found that if the flexible walls 62 are to have adequate strength and still be sufficiently flexible, they should be formed of plastics material having the general characteristics of fiberglass.

Shunt losses at the top and bottom of each cell unit 14 may also be greatly reduced by the use of suitable shunt curtains 70 which extend between adjacent cathodes 16 and are sealed with respect thereto. It is to be understood that as the anodes 18 are consumed, the shunt curtains 70 will flex so as to permit the cathodes 16 to move closer together. The shunt curtains 70 are also formed of a suitable electrolyte resistance material.

It is also to be understood that the covering 68 on each anode 18 may extend along the bottom and top side edges thereof as shown in FIG. 1. This covering, in cooperation with the associated shunt curtains, greatly reduces shunt losses at the tops and bottoms of the anodes.

It is to be understood that the covering material 68 will have sufficient flexibility so that as an anode 18 is consumed, the adjacent covering will fold back and not interfere with the contact of the anodes with the adjacent cathodes.

The gas utilized to pressurize the spaces 66 may be any suitable gas, although it is preferably the same gas which is customarily used in inerting the power module.

Although only a preferred embodiment of the power module has been specifically illustrated and described herein, it is to be understood that minor variations may be made in the construction of the casing without departing from the spirit and scope of the invention as defined by the appended claims.

We claim:

1. A power module casing for receiving plural cell units in adjacent relation and wherein each cell unit includes at least a consumable element with the cell units being progressively moved towards one end of said casing as the consumable elements are consumed, said casing being elongated and of a generally rectangular cross section and including ends and first and second opposing sides, manifold plates within said casing in spaced adjacent relation to said first sides and defining in combination therewith electrolyte supply and return manifolds, and sealing plates within said casing adjacent said second sides, said sealing plates extending at least between said manifolds, and means for introducing a fluid under pressure between each sealing plate and its respective second side for urging each sealing plate inwardly of said casing for sealing engagement with edges of cell units when such cell units are disposed therebetween.

2. The power module casing of claim 1 wherein said sealing plates are thin flexible sheets.

3. The power module casing of claim 1 wherein said sealing plates are thin flexible sheets of a plastics material.

4. The power module casing of claim 1 wherein said manifold plates extend between said sealing plates and are in edge to face sealing engagement therewith.

5. The power module casing of claim 1 wherein said fluid under pressure is an inert gas.

6. The power module casing of claim 1 together with a series of cell units within said casing, each said cell unit including a cathode and a consumable anode, means associated with said cathode for directing electrolyte from said supply manifold across the face of said anode and into said return manifold, and said sealing plates engaging sides of said cell units between said electrolyte manifolds and preventing electrolyte flow around said anodes.

7. The power module casing of claim 1 wherein side edges of said anodes have an electrolyte resistant covering in sealed sliding contact with said pressure plates.

8. The power module casing of claim 7 wherein said covering is formed of a plastics material film.

* * * * *